(12) United States Patent
Fujino

(10) Patent No.: US 7,164,517 B2
(45) Date of Patent: Jan. 16, 2007

(54) LIGHT SCANNING DEVICE AND IMAGE-FORMING APPARATUS USING THE SAME

(75) Inventor: Hitoshi Fujino, Kasugai (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 15 days.

(21) Appl. No.: 11/070,099

(22) Filed: Mar. 3, 2005

(65) Prior Publication Data

US 2005/0219673 A1 Oct. 6, 2005

(30) Foreign Application Priority Data

Mar. 31, 2004 (JP) .............................. P2004-107322

(51) Int. Cl.
*G02B 26/08* (2006.01)

(52) U.S. Cl. .................................. 359/207; 347/259

(58) Field of Classification Search ........ 359/205–207; 347/259
See application file for complete search history.

(56) References Cited

U.S. PATENT DOCUMENTS

| 5,025,268 | A | 6/1991 | Arimoto et al. | |
|---|---|---|---|---|
| 5,648,875 | A | 7/1997 | Okamura | |
| 6,590,688 | B1 | 7/2003 | Ishihara | |
| 6,757,004 | B1* | 6/2004 | Kato | 347/244 |
| 6,943,927 | B1* | 9/2005 | Ishihara | 359/205 |
| 2003/0202229 | A1 | 10/2003 | Ishihara | |
| 2004/0047019 | A1 | 3/2004 | Ishihara | |

FOREIGN PATENT DOCUMENTS

| JP | B2 07-069521 | 7/1995 |
|---|---|---|
| JP | B2 2945247 | 6/1999 |
| JP | B2 3035993 | 2/2000 |
| JP | A 2001-108927 | 4/2001 |
| JP | A 2001-194611 | 7/2001 |
| JP | A 2002-048993 | 2/2002 |
| JP | A 2003-043392 | 2/2003 |
| JP | A 2003-156704 | 5/2003 |

OTHER PUBLICATIONS

US 6,671,076, 12/2003, Ishihara (withdrawn)

* cited by examiner

*Primary Examiner*—Euncha P. Cherry
(74) *Attorney, Agent, or Firm*—Oliff & Berridge, PLC

(57) ABSTRACT

In an lens of a scanner unit, a first incidence surface of a first lens is formed as an aspherical surface rotationally symmetrical with respect to an optical axis while a first emergence surface is formed as a shape asymmetrical in a main scanning direction with respect to the optical axis and having a curvature asymmetrically variable in a sub scanning direction with respect to the optical axis. Each of second incidence surface and second emergence surface of a second lens is formed as a shape symmetrical in the main scanning direction with respect to the optical axis and having a curvature symmetrically variable in the sub scanning direction with respect to the optical axis. A mold for the lens can be produced easily when only the first emergence surface of the first lens can be formed as an asymmetrically variable shape.

20 Claims, 5 Drawing Sheets

LIGHT SCANNING DEVICE AND IMAGE-FORMING APPARATUS USING THE SAME

BACKGROUND OF THE INVENTION

1. Field of the Invention

The present invention relates to an image-forming apparatus such as a laser printer and a light scanning device mounted in the image-forming apparatus.

2. Description of the Related Art

A scanner unit for scanning a laser beam on a charged photoconductor to form an electrostatic latent image based on image data is mounted in an image-forming apparatus such as a laser printer.

Generally, the scanner unit includes a light source such as a semiconductor laser, a polygon mirror (rotational polygon mirror) driven to rotate by a motor, and an fθ lens having fθ characteristic. Light emitted from the light source is deflected by the polygon mirror and then an image of the light is formed on a charged surface of the photoconductor by the fθ lens.

In recent years, the demand for reduction in size of the scanner unit has increased with the advance of reduction in size of the image-forming apparatus. As an fθ lens provided in this type scanner unit, there has been proposed a system including an anamorphic plus lens which is formed so that at least one lens surface of the plus lens has a shape asymmetrically variable in the main scanning direction with respect to the center of the optical axis of the imaging device, and that the lens surface has a lens section symmetrically variable in the sub scanning direction with respect to the center of the optical axis of the imaging device to thereby correct asymmetry in curvature of field in the main scanning direction and the sub scanning direction (e.g. see Japanese Patent No. 3,035,993).

For example, there has been also proposed a system having a plurality of child line asymmetrical variable surfaces formed so that the curvature in the direction of a child line changes asymmetrically in the direction of a mother line in which the optical axis of the scanning optical device is sandwiched (e.g. see JP-A-2001-194611).

For example, there has been further proposed a system having two or more optical elements formed so that the two optical elements have at least one aspherical surface having positive refractive power in a main scanning section, and that the radii of curvature of at least two surfaces of the two optical elements have one extreme value along the main scanning direction in a sub scanning section (e.g. see JP-A-2003-156704).

SUMMARY OF THE INVENTION

As described above, the fθ lens generally has two lenses each having an incidence surface and an emergence surface. When, for example, the two lenses are a first lens having a first incidence surface and a first emergence surface and a second lens having a second incidence surface and a second emergence surface, the fθ lens described in Patent Document 1 is more specifically configured so that the first incidence surface and the first emergence surface of the first lens in the first embodiment are formed as surfaces rotationally symmetrical with respect to the optical axis, and that the second incidence surface and the second emergence surface of the second lens are formed as surfaces asymmetrical in the main scanning direction with respect to the optical axis and having a curvature constant in the sub scanning direction.

The fθ lens described in JP-A-2001-194611 is more specifically configured so that the first incidence surface of the first lens in Embodiment 1 is formed as a surface symmetrical in the main scanning direction with respect to the optical axis and having a curvature constant in the sub scanning direction while the first emergence surface of the first lens is formed as a surface asymmetrical in the main scanning direction with respect to the optical axis and asymmetrical in the sub scanning direction with respect to the optical axis. Moreover, the second incidence surface of the second lens is formed as a surface asymmetrical in the main scanning direction with respect to the optical axis and asymmetrical in the sub scanning direction with respect to the optical axis while the second emergence surface of the second lens is formed as a surface asymmetrical in the main scanning direction with respect to the optical axis and symmetrically variable in the sub scanning direction with respect to the optical axis.

The fθ lens described in JP-A-2003-156704 is more specifically configured so that the first incidence surface of the first lens in Embodiment 1 is formed as a surface symmetrical in the main scanning direction with respect to the optical axis and symmetrically variable in the sub scanning direction with respect to the optical axis while the first emergence surface of the first lens is formed as a surface symmetrical in the main scanning direction with respect to the optical axis and asymmetrically variable in the sub scanning direction with respect to the optical axis. Moreover, the second incidence surface of the second lens is formed as a surface symmetrical in the main scanning direction with respect to the optical axis and symmetrically variable in the sub scanning direction with respect to the optical axis while the second emergence surface of the second lens is formed as a surface symmetrical in the main scanning direction with respect to the optical axis and symmetrically variable in the sub scanning direction with respect to the optical axis.

In the fθ lens described in Japanese Patent No. 3,035,993, it is however necessary to form the second incidence surface and the second emergence surface of the second lens as surfaces asymmetrical in the main scanning direction with respect to the optical axis, that is, it is necessary to form two asymmetrical surfaces. For this reason, molds for molding lenses need to have high processing accuracy. Accordingly, increase in cost for production of the molds is inevitable.

Also in the fθ lens described in JP-A-2001-194611, it is necessary to form the first emergence surface of the first lens and the second incidence surface and the second emergence surface of the second lens as surfaces asymmetrical in the main scanning direction with respect to the optical axis and asymmetrical or symmetrical in the sub scanning direction with respect to the optical axis, that is, it is necessary to form three asymmetrical surfaces. For this reason, molds for molding lenses need to have high processing accuracy. Accordingly, increase in cost for production of the molds is still inevitable.

On the other hand, in the fθ lens described in JP-A-2003-156704, only the first emergence surface of the first lens needs to be formed as a surface asymmetrically variable in the sub scanning direction, that is, only one asymmetrical surface needs to be formed. For this reason, the formation of asymmetrical surfaces can be reduced compared with the fθ lens described in Japanese Patent No. 3,035,993 or JP-A-2001-194611. In the fθ lens described in JP-A-2003-156704, it is however necessary to make the symmetry axis of the second lens asymmetrical with respect to the optical axis. For this reason, it is necessary to dispose the second lens so accurately as to displace the second lens from the optical axis in assembling of the second lens. Troublesome labor is required for assembling the second lens.

It is an object of the invention to provide a light scanning device which can be configured easily while reduction in size can be attained so that reduction in cost can be attained, and an image-forming apparatus having the light scanning device.

To achieve the foregoing object, according to one aspect of the invention, there is provided with a light scanning device including a light source for generating light for exposing a photoconductor, deflection device for deflecting the light given from the light source to thereby scan the light in a main scanning direction, and imaging device for forming an image of the light given from the deflection device on the photoconductor, wherein: the imaging device includes a first lens, and a second lens, the first lens having a first incidence surface on which light is incident, and a first emergence surface from which the light incident on the first incidence surface emerges, the second lens having a second incidence surface on which light is incident, and a second emergence surface from which the light incident on the second incidence surface emerges; one of the first incidence surface and the first emergence surface is an aspherical surface rotationally symmetrical with respect to an optical axis or has a shape symmetrical in the main scanning direction with respect to the optical axis and having a curvature symmetrically variable in a sub scanning direction with respect to the optical axis while the other of the first incidence surface and the first emergence surface has a shape asymmetrical in the main scanning direction with respect to the optical axis and having a curvature asymmetrically variable in the sub scanning direction with respect to the optical axis; and each of the second incidence surface and the second emergence surface has a shape symmetrical in the main scanning direction with respect to the optical axis and having a curvature symmetrically variable in the sub scanning direction with respect to the optical axis.

According to this configuration, the imaging device can be produced when the first incidence surface or the first emergence surface of the first lens is formed as a shape having a curvature asymmetrically variable in the sub scanning direction with respect to the optical axis, that is, when only one asymmetrical surface is formed. For this reason, a portion which is part of a mold for molding a lens and which needs to have high processing accuracy can be reduced. Accordingly, reduction in cost for production of the mold can be attained. According to this configuration, the first and second lenses can be disposed on the optical axis. Accordingly, the first and second lenses can be disposed accurately by simple assembling. As a result, configuration can be simplified while reduction in size can be attained, so that reduction in cost can be attained.

According to another aspect of the invention, either of the first incidence surface and the first emergence surface tilts with respect to the optical axis.

According to this configuration, either of the first incidence surface and the first emergence surface tilts with respect to the optical axis. Accordingly, the first lens can be assembled without causing any problem and without necessity of high processing accuracy. Accordingly, improvement in assembling characteristic can be attained.

According to another aspect of the invention, the shape asymmetrical in the main scanning direction with respect to the optical axis is formed in such a manner that a surface symmetrical in the main scanning direction with respect to the optical axis tilts.

According to this configuration, the shape asymmetrical in the main scanning direction with respect to the optical axis is formed in such a manner that a surface symmetrical in the sub scanning direction with respect to the optical axis is tilted. Accordingly, the asymmetrical surface can be formed easily. For this reason, a mold for molding a lens can be processed easily, so that reduction in cost for production of the mold can be attained.

According to another aspect of the invention, the amount of sag in the shape having a curvature symmetrically or asymmetrically variable in the sub scanning direction with respect to the optical axis is expressed as an aspherical surface represented by a two-dimensional polymoninal.

According to this configuration, the amount of sag in the shape having a curvature symmetrically or asymmetrically variable in the sub scanning direction with respect to the optical axis can be expressed as an aspherical surface represented by a two-dimensional polymoninal. Accordingly, the amount of sag can be calculated easily.

According to another aspect of the invention, the imaging device satisfies the condition $$0.65 < k/W \leqq 0.81$$

in which k is the focal length of the imaging device, and W is the effective scanning width of the photoconductor.

According to this configuration, the scanning angle of light can be reduced so that the focal length can be shortened. For this reason, reduction in size of the device can be attained.

According to another aspect of the invention, the imaging device satisfies the condition $$0.65 < k/(W+2r) \leqq 0.81$$

in which k is the focal length of the imaging device, W is the effective scanning width of the photoconductor, and r is a distance from an end of the effective scanning width W to a position irradiated with light for defining scanning start timing in the photoconductor.

According to this configuration, while the scanning angle of light can be reduced so that the focal length can be shortened, the optical path from one end of the effective scanning width W to a position irradiated with light for defining the scanning start timing can be secured.

According to another aspect of the invention, the first lens is formed so that the thickness of the first lens on the optical axis is not larger than 7 mm in a direction of the optical axis.

According to this configuration, the thickness of the first lens in the direction of the optical axis can be reduced, so that reduction in cost based on reduction in size of the first lens and reduction in material can be attained.

According to another aspect of the invention, the deflection device has a reflection surface for reflecting the light given from the light source; and the first lens is disposed so that the distance from a point of reflection of the light on the reflection surface to the first incidence surface is longer than 20 mm.

According to this configuration, the degree of freedom in the incidence angle of light emitted from the light source and incident on the deflection device can be increased. For this reason, the degree of freedom for design of the device can be increased.

According to another aspect of the invention, the first lens is formed so that the maximum thickness of the first lens in the direction of the optical axis is not larger than 7 mm, and that the rate of fluctuation in the thickness of the first lens in the direction of the optical axis is not larger than 60%.

According to this configuration, the thickness of the first lens in the direction of the optical axis can be reduced and made uniform. For this reason, reduction in size of the first lens and improvement in moldability can be attained.

According to another aspect of the invention, at least one of the first incidence surface and the first emergence surface has at least one inflection point in a sectional shape along the main scanning direction.

According to this configuration, the width of the first lens in the direction of the optical axis can be narrowed because at least one of the first incidence surface and the first emergence surface has at least one inflection point in a sectional shape along the main scanning direction. For this reason, reduction in size of the first lens can be attained.

According to another aspect of the invention, the first incidence surface is an aspherical surface rotationally symmetrical with respect to the optical axis or has a shape symmetrical in the main scanning direction with respect to the optical axis and having a curvature symmetrically variable in the sub scanning direction with respect to the optical axis; and the first emergence surface has a shape asymmetrical in the main scanning direction with respect to the optical axis and having a curvature asymmetrically variable in the sub scanning direction with respect to the optical axis.

According to this configuration, the first lens can be formed easily.

According to another aspect of the invention, the first incidence surface is an aspherical surface rotationally symmetrical with respect to the optical axis.

According to this configuration, a mold for molding the first lens can be produced easily. For this reason, the first lens can be formed while the cost for production of the first lens can be reduced.

According to another aspect of the invention, at least one of the first lens and the second lens has an alignment surface for alignment with the optical axis; and the light scanning device further includes a housing for storing the first lens and the second lens, and a support portion provided in the housing so as to be brought into contact with the alignment surface to thereby align and support the at least one of the first lens and the second lens.

According to this configuration, at least one of the first lens and the second lens can be aligned easily and surely when the alignment surface of the at least one of the first lens and the second lens is made to abut o the support portion provided in the housing. For this reason, improvement in assembling efficiency can be attained.

According to another aspect of the invention, each of the first lens and the second lens has the alignment surface; and the support portion includes a first support portion, and a second support portion, the first support portion being brought into contact with the alignment surface of the first lens to align and support the first lens, the second support portion being brought into contact with the alignment surface of the second lens to align and support the second lens.

According to this configuration, the first and second lenses can be aligned easily and surely when the alignment surfaces of the first and second lenses are made to abut on the first and second support portions respectively. For this reason, greater improvement in assembling efficiency can be attained.

According to another aspect of the invention, the alignment surfaces are provided in opposite end portions of the first incidence surface in the main scanning direction.

According to this configuration, accurate alignment of the first lens can be achieved while light scanned in the main scanning direction can be transmitted surely because the alignment surfaces are provided in opposite end portions of the first incidence surface in the main scanning direction.

According to another aspect of the invention, the alignment surfaces are provided in opposite end portions of the second incidence surface in the main scanning direction.

According to this configuration, accurate alignment of the second lens can be achieved while light scanned in the main scanning direction can be transmitted surely because the alignment surfaces are provided in opposite end portions of the second incidence surface in the main scanning direction.

According to another aspect of the invention, an image-forming apparatus including: a photoconductor on which an electrostatic latent image is formed; and the-above light scanning device.

Because the image-forming apparatus is provided with the light scanning device in which reduction in size can be attained, reduction in size of the image-forming apparatus can be attained.

DESCRIPTION OF THE PREFERRED EMBODIMENTS

Figure 1:
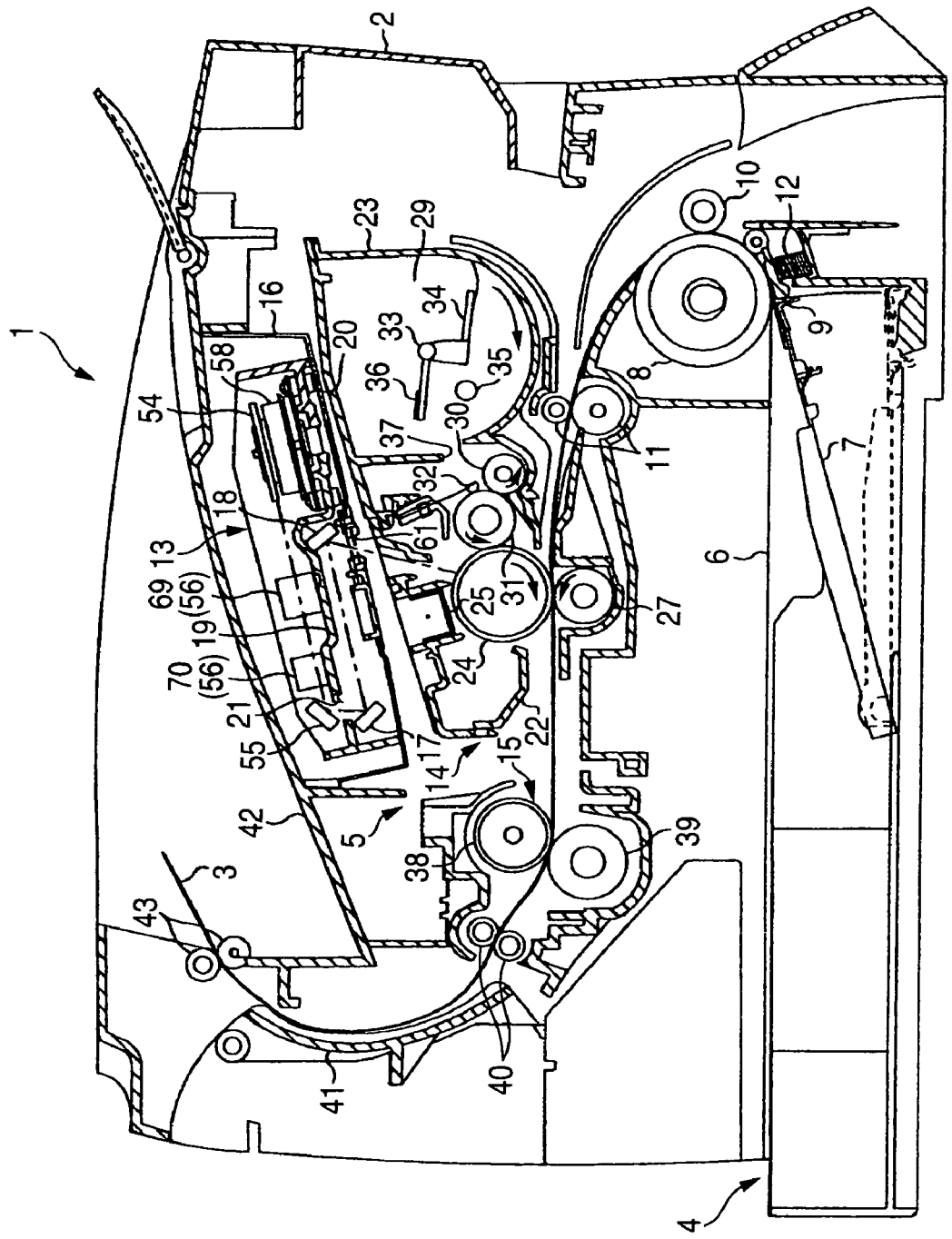
FIG. 1 is a side sectional view of important part showing an embodiment of a laser printer as an image-forming apparatus according to one embodiment of the invention.

FIG. 1 is a side sectional view of important part showing an embodiment of a laser printer as an image-forming apparatus according to one embodiment of the invention. In FIG. 1, the laser printer 1 has a body casing 2. A feeder portion 4 for feeding paper 3 and an image-forming portion 5 for forming an image on a fed sheet of paper 3 are provided in the body casing 2.

The feeder portion 4 has a paper supply tray 6 detachably attached to a bottom portion of the body casing 2, a paper pressing plate 7 provided in the paper supply tray 6, a paper supply roller 8 and a paper supply pad 9 provided above an end portion of the paper supply tray 6, a paper dust removal roller 10 disposed opposite to the paper supply roller 8, and registration rollers 11 provided on a site opposite to the paper dust removal roller 10 with respect to the paper supply roller 8.

Incidentally, in the following description, the side of provision of the paper supply roller 8 in the laser printer 1 is referred to as "front side" while the side opposite to the front side is referred to as "rear side".

The paper pressing plate 7 is provided so that sheets of paper 3 can be stacked. The paper pressing plate 7 is supported so as to be movable at an end portion farther from the paper supply roller 8. Thus, an end portion nearer to the paper supply roller 8 can move vertically. The paper pressing plate 7 is urged upward by a spring not shown from the rear side. For this reason, as the amount of stacked sheets of paper 3 increases, the paper pressing plate 7 moves down against the urging force of the spring while the end portion farther from the paper supply roller 8 is used as a fulcrum.

The paper supply roller 8 and the paper supply pad 9 are disposed opposite to each other. The paper supply pad 9 is pressed toward the paper supply roller 8 by a spring 12 provided on the rear side of the paper supply pad 9.

The uppermost sheet of paper 3 on the paper pressing plate 7 is pressed toward the paper supply roller 8 by a spring not shown from the rear side of the paper pressing plate 7. In this manner, sheets of paper 3 are supplied one by one after clamped between the paper supply roller 8 and the paper supply pad 9 in accordance with the rotation of the paper supply roller 8.

The fed sheet of paper 3 is conveyed to the registration rollers 11 after paper dust is removed by the paper dust removal roller 10. The registration rollers 11 are provided as a pair of rollers for conveying the sheet of paper 3 to a transfer position (between a photo sensitive drum 24 and a transfer roller 27 as will be described later) of the image-forming portion 5 after registration.

The image-forming portion 5 has a scanner unit 13 as a light scanning device, a process cartridge 14, and a fixing portion 15.

The scanner unit 13 has a housing 16 (which will be described later in detail) provided in an upper portion in the body casing 2. A laser light source 52 (see FIG. 2), a cylindrical lens 53 (see FIG. 2), a polygon mirror 54, a first reflection mirror 55, an fθ lens 56, a BD (beam detector) sensor portion 57 (see FIG. 2), a second reflection mirror 17 and a third reflection mirror 18 are provided in the housing 16. The laser light source 52 serves as a light source. The polygon mirror 54 serves as a deflection device. The fθ lens 56 serves as imaging device and is composed of a first lens 69 and a second lens 70.

The housing 16 is made of a resin and shaped like a box which is thin vertically and extends horizontally, that is, which is approximately rectangular in plan view, in the state that the housing is provided in the body casing 2. A support plate 19 for partitioning the inside space of the housing 16 into upper and lower parts is provided in the housing 16. The support plate 19 has a front portion disposed near a bottom wall 20 of the housing 16 and along the bottom wall 20 of the housing 16. The support plate 19 supports the laser light source 52 (see FIG. 2), the cylindrical lens 53 (see FIG. 2), and a motor board 58 in which the polygon mirror 54 and a scanner motor for driving the polygon mirror 54 are stored.

The support portion 19 has a rear portion which is formed so that it is erected vertically from a rear end portion of the front portion of the support plate 19 and then extends horizontally and is substantially disposed in the center of the housing 16 in the vertical direction. The rear portion of the support plate 19 supports the fθ lens 56, the first reflection mirror 55 and the BD sensor portion 57. A passage window 21 piercing the support plate 19 in the direction of thickness is formed in a rear end portion of the support plate 19 and near the first reflection mirror 55.

The second reflection mirror 17 and the third reflection mirror 18 are disposed in the lower inside space formed in the housing 16 by the support plate 19. The second reflection mirror 17 is supported by the support plate 19 at a rear end portion vertically opposite to the first reflection mirror 55. The third reflection mirror 18 is supported by the support plate 19 at a position substantially horizontally and forwardly far by a predetermined distance from the second reflection mirror 17.

Incidentally, an outgoing window 61 piercing the bottom wall 20 in the direction of thickness is formed in the bottom wall 20 of the housing 16 and near the third reflection mirror 18.

After laser light emitted from the laser light source 52 (see FIG. 2) on the basis of image data passes through the cylindrical lens 53 (see FIG. 2) in the upper inside space formed in the housing 16 by the support plate 19, the laser light passes through the polygon mirror 54 and the fθ lens 56 successively as represented by the chain line. After the laser light is then reflected by the first reflection mirror 55, the laser light goes through the passage window 21 into the lower inside space formed in the housing 16 by the support plate 19. After the laser light is then reflected by the second and third reflection mirrors 17 and 18, the laser light goes out through the outgoing window 61 so as to be applied on a surface of the photosensitive drum 24 (which will be described later) of the process cartridge 14 by high-speed scanning.

The process cartridge 14 below the scanner unit 13 is detachably attached to the body casing 2. The process cartridge 14 has a drum cartridge 22, and a developing cartridge 23. The drum cartridge 22 supports the photosensitive drum 24 as a photoconductor, a scorotron type charger 25 and a transfer roller 27. The developing cartridge 23 is detachably attached to the drum cartridge 23.

The developing cartridge 23 has a toner storage chamber 29, a supply roller 30, a developing roller 31, a layer thickness limiting blade 32.

Positively chargeable non-magnetic one-component toner as a developing agent is stored in the toner storage chamber 29. Polymer toner is used as the toner. The polymer toner can be prepared in such a manner that polymerizable monomers, for example, styrene monomers such as styrene, etc. or acrylic monomers such as acrylic acid, alkyl (C1 to C4) acrylate, alkyl (C1 to C4) methacrylate, etc. are copolymerized by device of suspension polymerization or the like. Each particle of such polymer toner is formed spherically and very excellent in fluidity, so that a high-quality image can be formed. Incidentally, a coloring agent such as carbon black, etc., wax or the like may be mixed with the toner. An external additive such as silica may be added to the toner in order to improve the fluidity of the toner. The mean particle size of the toner particles is from about 6 to about 10 μm.

A rotation axis 33 is provided in the center of the toner storage chamber 29 and along the widthwise direction (perpendicular to the front-rear direction, the same rule applies hereunder). An agitator 34 and a cleaner 36 are provided on the rotation axis 33. The agitator 34 is provided for agitating the toner in the toner storage chamber 29. The cleaner 36 is provided for cleaning windows 35 which are disposed on widthwise opposite sides of the toner storage chamber 29 and which are provided for detecting the residual amount of the toner.

When the rotation axis 33 rotates in the direction of the arrow (clockwise), the toner in the toner storage chamber 29 is agitated by the agitator 34 supported by the rotation axis 33. Thus, the toner is released from a toner release port 37 of the toner storage chamber 29 toward the supply roller 30. At the same time, the windows 35 are cleaned by the cleaner 36 in accordance with the rotation of the rotation axis 33.

The supply roller 30 is provided in the obliquely downward rear of the toner release port 37 so as to be rotatable in the direction of the arrow (counterclockwise). The supply roller 30 has a roller shaft made of metal, and a roller member made of electrically conductive sponge. The roller shaft is covered with the roller member. Opposite end portions of the roller shaft are supported by the developing cartridge 23 so as to be rotatable.

The developing roller 31 is disposed in the obliquely upward rear of the supply roller 30 as to be opposite to the supply roller 30. The developing roller 31 is provided so as to be rotatable in the direction of the arrow (counterclockwise). The developing roller 31 has a roller shaft made of metal, and a roller member made of electrically conductive elastic rubber. The roller shaft is covered with the roller member. More specifically, the roller member of the developing roller 31 has a roller layer made of electrically conductive urethane rubber or silicone rubber containing carbon fine particles or the like, and a coat layer made of urethane rubber or silicone rubber containing fluorine. The roller layer is covered with the coat layer. The developing roller 31 is provided so that opposite end portions of the roller shaft are supported by the developing cartridge 23 so as to be rotatable.

At the time of developing, a developing bias is applied to the developing roller 31.

The supply roller 30 and the developing roller 31 abut on each other so that they are compressed to a certain degree.

The layer thickness limiting blade 32 is made of a leaf spring member. An upper end portion of the layer thickness limiting blade 32 is supported by the developing cartridge 23 above the developing roller 31. A pressure contact portion made of electrically insulating silicone rubber and substantially shaped like a half circle in sectional view is provided in a lower end portion of the layer thickness limiting blade 32. The pressure contact portion presses a surface of the developing roller 31 from the rear by the elastic force of the leaf spring member.

The toner released from the toner release port 37 is supplied to the developing roller 31 in accordance with the rotation of the supply roller 30. On this occasion, the toner is positively frictionally charged between the supply roller 30 and the developing roller 31. The toner supplied onto the developing roller 31 further goes between the pressure contact portion of the layer thickness limiting blade 32 and the developing roller 31 in accordance with the rotation of the developing roller 31, so that the toner is carried as a thin layer on the developing roller 31.

The photosensitive drum 24 is disposed in the rear of the developing roller 31 so as to be opposite to the developing roller 31. The photosensitive drum 24 is provided in the drum cartridge 22 so as to be rotatable in the direction of the arrow (clockwise). The photosensitive drum 24 is shaped like a cylinder having a surface constituted by a positively chargeable photosensitive layer made of polycarbonate or the like. The photosensitive drum 24 is grounded.

The scorotron type charger 25 is provided above the photosensitive drum 24 so as to be at a predetermined distance from the photosensitive drum 24 so that the scorotron type charger 25 is prevented from coming into contact with the photosensitive drum 24. The scorotron type charger 25 is a positive charging scorotron type charger for generating corona discharge from a charging wire of tungsten or the like. The surface of the photosensitive drum 24 is uniformly positively charged by the charger 25.

When the photosensitive drum 24 is rotated, the surface of the photosensitive drum 24 is first uniformly positively charged by the scorotron type charger 25. Then, the surface of the photosensitive drum 24 is exposed to laser light emitted from the scanner unit 16 by high-speed scanning, so that an electrostatic latent image based on image data is formed.

When the developing roller 31 comes into the photosensitive drum 24 while facing the photosensitive drum 24, the toner carried on the developing roller 31 and positively charged is supplied to the electrostatic latent image formed on the surface of the photosensitive drum 24, that is, an exposure portion which is part of the uniformly positively charged surface of the photosensitive drum 24 and which has an electric potential reduced because of exposure to the laser light, in accordance with the rotation of the developing roller 31. In this manner, the toner is selectively carried on the exposure portion to thereby visualize the electrostatic latent image. As a result, reversal development is achieved so that a toner image is carried on the surface of the photosensitive drum 24.

The transfer roller 27 is disposed below the photosensitive drum 24 so as to be opposite to the photosensitive drum 24. The transfer roller 27 is supported by the drum cartridge 22 so as to be rotatable in the direction of the arrow (counterclockwise).

The transfer roller 27 has a roller shaft made of metal, and a roller member made of electrically conductive elastic rubber. The roller shaft is covered with the roller member. At the time of transfer, a transfer bias is applied to the transfer roller 27.

When the sheet of paper 3 is conveyed from the registration rollers 11 into the transfer position between the photosensitive drum 24 and the transfer roller 27, the toner image carried on the surface of the photosensitive drum 24 is transferred by the transfer bias applied to the transfer roller 27 while the sheet of paper 3 is conveyed between the photosensitive drum 24 and the transfer roller 27 in accordance with the rotation of the photosensitive drum 24 and the transfer roller 27.

The fixing portion 15 is provided in the rear of the process cartridge 14 and on the downstream side in the direction of conveyance of the sheet of paper 3. The fixing portion 15 has a heat roller 38, a pressure roller 39, and a pair of conveyance rollers 40.

The heat roller 38 has a roller portion made of metal, and a halogen lamp provided in the roller portion for heating the toner. The pressure roller 39 is disposed under the heat roller 38 so as to be opposite to the heat roller 38 to press the heat roller 38. The pair of conveyance rollers 40 are disposed on the downstream side of the heat roller 38 and the pressure roller 39 in the direction of conveyance of the sheet of paper 3.

In the fixing portion 15, the toner transferred onto the sheet of paper 3 in the transfer position is thermally fixed while the sheet of paper 3 passes through between the heat roller 38 and the pressure roller 39. Then, the sheet of paper 3 is conveyed to a paper ejection path 41 by the pair of conveyance rollers 40.

A paper ejection tray 42 for receiving sheets of paper 3 stackably is provided in the upper surface of the body casing 2. Paper ejection rollers 43 are provided above the rear side of the paper ejection tray 42 opposite to the fixing portion 15. The paper ejection path 41 for conveying the sheet of paper 3 is provided between the paper ejection rollers 43 and the conveyance rollers 40 of the fixing portion 15.

The sheet of paper 3 conveyed from the fixing portion 15 to the paper ejection path 41 is conveyed from the paper ejection path 41 to the paper ejection rollers 43 and ejected onto the paper ejection tray 42 by the paper ejection rollers 43.

Incidentally, in the laser printer 1, the residual toner remaining on the surface of the photosensitive drum 24 after transfer onto the sheet of paper 3 by the transfer roller 27 is collected by a so-called cleanerless method in which the residual toner is collected by the developing roller 31. When the residual toner remaining on the surface of the photosensitive drum 24 is collected by such a cleanerless method, any cleaner device such as a blade and any waste toner reservoir device can be dispensed with. The configuration of the apparatus can be simplified, so that reduction in size and cost can be attained.

Figure 2:
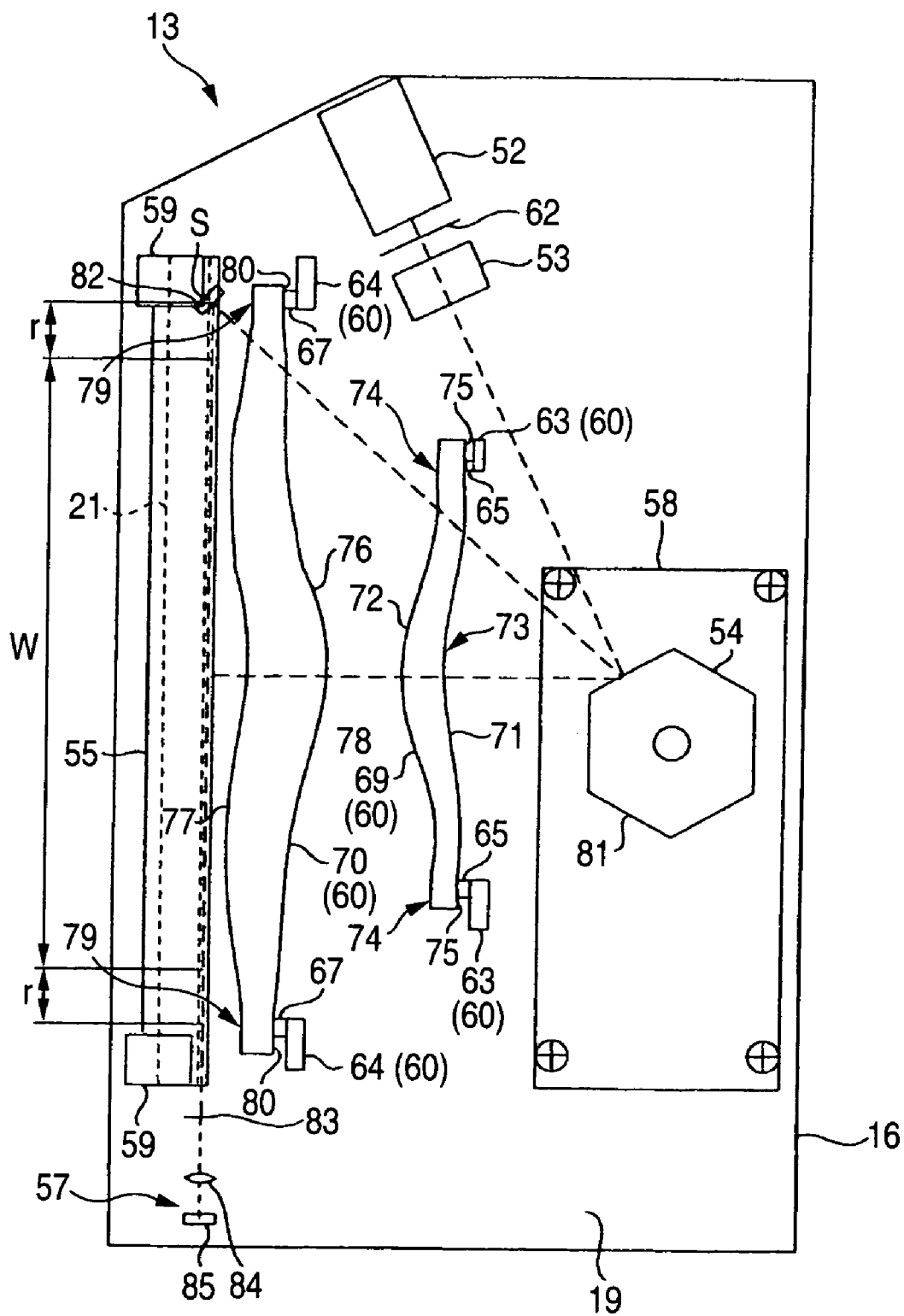
FIG. 2 is a schematic plan view showing an upper inside space formed in a housing by a support plate in a scanner unit of the laser printer depicted in FIG. 1.

FIG. 2 is a schematic plan view showing the upper inside space formed in the housing 16 by the support plate 19 in the scanner unit 13.

As described above, the laser light source 52, an aperture stop 62, the cylindrical lens 53, the polygon mirror 54, the first reflection mirror 55, the fθ lens 56, the BD sensor portion 57 and the motor board 58 are disposed in the upper inside space formed in the housing 16 by the support plate 19.

The motor board 58, mirror support portions 59 for supporting the first reflection mirror 55, lens support portions 60 as support portions for supporting the fθ lens 56 and the passage window 21 through which the laser light goes out to the lower inside space formed in the housing 16 by the support plate 19 are formed in the support plate 19.

The motor board 58 is disposed on the front side of the housing 16 and substantially shaped like a rectangular box extending in the widthwise direction. A not-shown scanner motor for driving the polygon mirror 54 to rotate is stored in the motor board 58.

The mirror support portions 59 are disposed on the rear side of the housing 16 and provided as a pair so that widthwise opposite end portions of the first reflection mirror 55 can be supported. The mirror support portions 59 are disposed opposite to each other so as to be at a predetermined distance from each other in the widthwise direction. Incidentally, the mirror support portions 59 are made of a resin and formed integrally with the support plate 19 so as to be erected from the support plate 19.

The lens support portions 60 are disposed on front and rear sides between the motor board 58 and the mirror support portions 59. The lens support portions 60 have first lens support portions 63 as first support portions, and second lens support portions 64 as second support portions.

The first lens support portions 63 are disposed near the motor board 58 in the front-rear direction and provided as a pair so that widthwise opposite end portions of the first lens 69 which will be described later can be supported. The first lens support portions 63 are disposed opposite to each other so as to be at a predetermined distance from each other in the widthwise direction.

First reception portions 65 protruding backward from the rear surfaces of the first lens support portions 63 and provided for receiving the first lens 69 are formed in the first lens support portions 63 respectively.

Incidentally, the first lens support portions 63 are made of a resin and formed integrally with the support plate 19 so as to be erected from the support plate 19.

The second lens support portions 64 are disposed near the mirror support portions 59 in the front-rear direction and provided as a pair so that widthwise opposite end portions of the second lens 70 which will be described later can be supported. The second lens support portions 64 are disposed opposite to each other so as to be at a predetermined distance from each other in the widthwise direction.

Second reception portions 67 protruding backward from the rear surfaces of the second lens support portions 64 and provided for receiving the second lens 70 are formed in the second lens support portions 64 respectively.

Incidentally, the second lens support portions 64 are made of a resin and formed integrally with the support plate 19 so as to be erected from the support plate 19.

The passage window 21 is formed in such a manner that a hole substantially shaped like a long rectangle along the widthwise direction is formed in the support plate 19 and between the mirror support portions 59.

The laser light source 52 is disposed in a widthwise end portion of the housing 16 and in the middle of the front-rear direction. The laser light source 52 has a laser diode, and a collimator lens. The laser diode has a plurality of light-emitting points. The collimator lens converts laser light emitted from the laser diode, into parallel light beams in the main scanning direction Y (see FIG. 3B) and the sub scanning direction X (see FIG. 3A). The laser diode is integrated with the collimator lens.

In the laser light source 52, after a plurality of laser beams (multi-beam) emitted from the laser diode are converted into a plurality of parallel beams by the collimator lens, the plurality of parallel beams go inward in the widthwise direction of the housing 16 and go out in a direction inclined forward in the front-rear direction.

The aperture stop 62 is disposed on the optical path of the laser light emitted from the laser light source 52. The aperture stop 62 shapes the laser light like a beam.

The cylindrical lens 53 is disposed on the optical path of the laser light emitted from the laser light source 52. The cylindrical lens 53 has refractive power only in the sub scanning direction X.

When the plurality of laser beams emitted from the laser light source 52 pass through the cylindrical lens 53, the plurality of laser beams are converged in the sub scanning direction X so as to be incident on the polygon mirror 54.

The polygon mirror 54 is disposed on the front side of the housing 16 and on the motor board 58 in the widthwise center of the housing 16. The polygon mirror 54 is formed as a polyhedron (hexahedron) having a plurality of reflection surfaces 81. The polygon mirror 54 is driven to rotate at a high speed by the motive power of the scanner motor stored in the motor board 58.

Figure 3A:
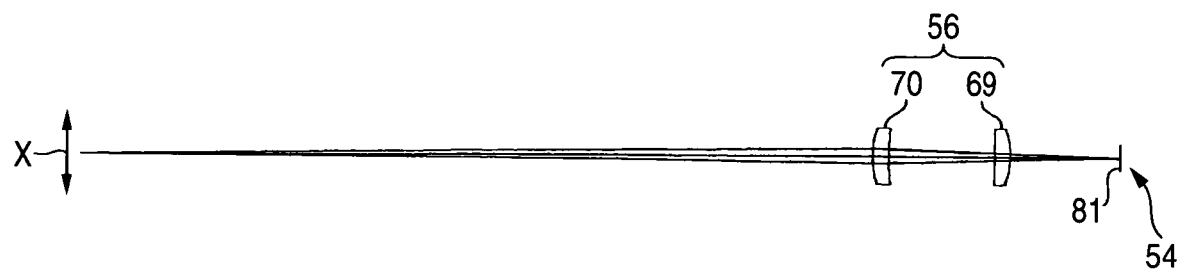
FIGS. 3A and 3B are views showing optical paths in the scanner unit depicted in FIG. 2, FIG. 3A showing optical paths in a sub scanning direction, FIG. 3B showing optical paths in a main scanning direction.
Figure 3B:
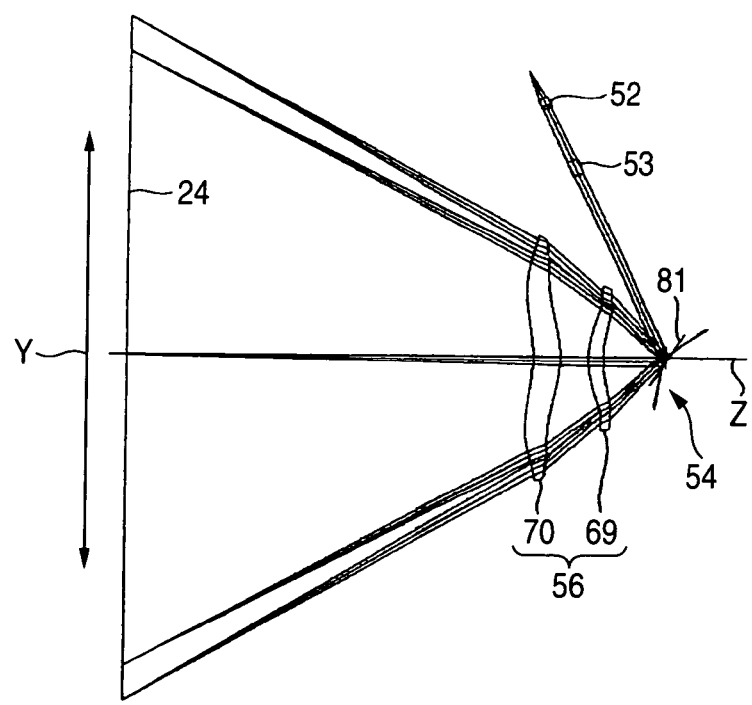

When the plurality of laser beams emitted from the cylindrical lens 53 and converged in the sub scanning direction X are incident on one of the reflection surfaces 81 of the polygon mirror 54 driven to rotate, the plurality of laser beams are deflected to make an equiangular motion and scanned in the main scanning direction Y (see FIGS. 3A and 3B).

The first reflection mirror 55 is made of a long angular reflection plate and disposed along the widthwise direction on the rear side of the housing 16. The first reflection mirror 55 is disposed opposite to the polygon mirror 54 so as to be at a predetermined distance from the polygon mirror 54 in the front-rear direction. Widthwise opposite end portions of the first reflection mirror 55 are supported by the mirror support portions 59. The passage window 21 is disposed below the first reflection mirror 55 so as to be opposite to the first reflection mirror 55.

The plurality of laser beams given from the polygon mirror 54 through the fθ lens 56 are reflected on the first reflection mirror 55 and go through the passage window 21 into the lower inside space formed in the housing 16 by the support plate 19 as described above. After the plurality of laser beams are then reflected on the second and third reflection mirrors 17 and 18, the plurality of laser beams go out from the outgoing window 61 to thereby form an image on the photosensitive drum 24.

The fθ lens 56 is disposed between the polygon mirror 54 and the first reflection mirror 55. The fθ lens 56 has the first and second lenses 69 and 70 having fθ characteristic so that an image of the plurality of laser beams scanned in the main scanning direction Y by the polygon mirror 54 can be formed on the surface of the photosensitive drum 24. The first and second lenses 69 and 70 are formed in such a manner that a plastic material such as an amorphous polyolefin resin or a polymethyl methacrylate resin is injected into a mold.

The first lens 69 is disposed between the polygon mirror 54 and the first refection mirror 55 and near the polygon mirror 54. The first lens 69 is shaped like a plate extending in the widthwise direction of the housing 16. The first lens 69 is formed so that the thickness of the first lens 69 on the optical axis Z (see FIGS. 3A and 3B) is not larger than 7 mm in the direction of the optical axis, that the maximum thickness of the first lens 69 is not larger than 7 mm in the direction of the optical axis, and that the rate of fluctuation in the thickness in the direction of the optical axis is not higher than 60%. Incidentally, the rate of fluctuation is given by the following expression:

Rate of Fluctuation (%)=100×(1−Dmax/Dmin)

in which Dmax is the maximum thickness of the lens, and Dmin is the minimum thickness of the lens.

When the first lens 69 is formed in the aforementioned manner, the thickness of the first lens 69 in the direction of the optical axis can be made small and uniform. For this reason, reduction in size and improvement in moldability of the first lens 69 can be attained.

The first lens 69 has a front surface formed as a first incidence surface 71 on which laser light is incident, and a rear surface formed as a first emergence surface 72 from which the laser light incident on the first incidence surface 71 emerges. As will be described later in detail, either of the first incidence surface 71 and the first emergence surface 72 has at least one inflection point in a sectional shape along the main scanning direction Y.

If either of the first incidence surface 71 and the first emergence surface 72 has at least one inflection point, reduction in size of the first lens 69 can be attained because the width (size) of the first lens 69 in the direction of the optical axis can be narrowed.

The first lens 69 has a first light passage portion 73, and first fixing portions 74. Laser light scanned in the main scanning direction Y passes through the first light passage portion 73. The first fixing portions 74 are provided in opposite sides of the first light passage portion 73, that is, opposite end portions of the first lens 69 in the main scanning direction Y. The first light passage portion 73 is continuously integrated with the first fixing portions 74. Respective front surfaces of the first fixing portions 74 are formed as smooth first alignment surfaces 75 for aligning the first lens 69 with respect to the optical axis Z.

The respective first alignment surfaces 75 of the first lens 69 abut on the rear surfaces of the first reception portions 65 of the first lens support portions 63 so that the first lens 69 is supported by the first lens support portions 63. Accordingly, as shown in FIGS. 3A and 3B, the first lens 69 is supported by the first lens support portions 63 while the first lens 69 is aligned with respect to the optical axis Z.

The first lens 69 is aligned in the main scanning direction Y in such a manner that a convex portion (not shown) formed on the bottom surface of the first lens 69 and a concave portion (not shown) formed in the support plate 19 are fitted to each other.

Incidentally, the first lens 69 is disposed so that the distance from a point of reflection of light in the reflection surface 81 of the polygon mirror 54 to the first incidence surface 71 is larger than 20 mm.

When the first lens 69 is disposed in this manner, the degree of freedom in the incidence angle of laser light emitted from the laser light source 52 and incident on the polygon mirror 54 can be increased. For this reason, the degree of freedom for apparatus design can be increased.

The first incidence surface 71 of the first light passage portion 71 of the first lens 69 is formed as an aspherical surface rotationally symmetrical with respect to the optical axis Z.

The aspherical surface rotationally symmetrical is expressed as the amount of sag Z (h) in the height (distance) from the optical axis Z. For example, it is given by the following expression (1).

[Numerical Expression 1]

$$Z(h) = \frac{ch^2}{1 - \sqrt{1-(1+k)c^2h^2}} + A_4h^4 + A_6h^6 + A_8h^8 + A_{10}h^{10} \quad (1)$$

In the expression (1), k is a Konig's coefficient, c is a curvature (1/R), h is a height (distance) from the optical axis Z, and $A_4$, $A_6$, $A_8$ and $A_{10}$ are aspherical coefficients of fourth order, sixth order, eighth order and tenth order respectively.

More specifically, in this embodiment, numerical values shown in Table 1 are set in $A_4$, $A_6$, A8 and $A_{10}$ in the first incidence surface 71.

TABLE 1

| | $A_4$ | $A_6$ | $A_8$ | $A_{10}$ |
|---|---|---|---|---|
| Aspherical Coefficient | 1.77E−005 | −8.13E−009 | 3.94E−011 | −4.82E−014 |

The first emergence surface 72 of the first light passage portion 71 of the first lens 69 has a shape asymmetrical in the main scanning direction Y with respect to the optical axis Z and having a curvature asymmetrically variable in the sub scanning direction X with respect to the optical axis Z.

For example, the shape is an aspherical surface represented by a two-dimensional polynomial. When the sub scanning direction designates an X axis, the main scanning direction designates a Y axis and the optical axis designates a Z axis as described above, the aspherical surface is expressed as the amount Z (h) of sag at a point (X, Y) having a height X in the sub scanning direction and a height Y in the main scanning direction on a tangential plane. For example, the amount Z (h) of sag is given by the following expression (2):

[Numerical Expression 2]

$$Z(h) = \frac{ch^2}{1 - \sqrt{1-(1+k)c^2h^2}} + \sum C_{mn} X^m Y^n \quad (2)$$

In the expression (2), k is a Konig's coefficient, c is a curvature (1/R), h is a height (distance) from the optical axis Z, $h^2$ is equal to $X^2+y^2$, and $C_{mn}$ is a coefficient of the $X_n Y_m$ term.

With respect to the sectional shape in the main scanning direction Y, when, for example, n in $C_{0n}$ in the term relating to $C_{0n}$ is an odd number, the sectional shape in the main scanning direction is asymmetrical with respect to the optical axis if $C_{0n}$ is a numerical value except zero.

With respect to the sectional shape in the sub scanning direction X, when, for example, n in $C_{2n}$ in the term relating to $C_{0n}$ is an odd number, the sectional shape in the sub scanning direction varies asymmetrically with respect to the optical axis if $C_{0n}$ is a numerical value except zero.

In this manner, the amount Z (h) of sag in the shape having a curvature symmetrically variable in the sub scanning direction X with respect to the optical axis Z can be expressed as an aspherical surface represented by a two-dimensional polynomial. Accordingly, the amount Z (h) of sag can be calculated easily.

More specifically, in this embodiment, numerical values shown in Table 2 are set in $C_{mn}$ in the first emergence surface 72.

As shown in FIG. 2, the second lens 70 is disposed between the polygon mirror 54 and the first reflection mirror 55 and near the first reflection mirror 55 so as to be at a predetermined distance from the first lens 69 in the direction of the optical axis. The second lens 70 is formed as a plate extending along the widthwise direction of the housing 16.

The second lens 70 has a front surface formed as a second incidence surface 76 on which laser light is incident, and a rear surface formed as a second emergence surface 77 from which the laser light incident on the second incidence surface 76 emerges.

The second lens 70 has a second light passage portion 78, and second fixing portions 79. Laser light scanned in the main scanning direction Y passes through the second light passage portion 78. The second fixing portions 79 are provided in opposite sides of the second light passage portion 78, that is, opposite end portions of the second lens 70 in the main scanning direction Y. The second light passage portion 78 is continuously integrated with the second fixing portions 79. Respective front surfaces of the second fixing portions 79 are formed as smooth second alignment surfaces 80 for aligning the second lens 70 with respect to the optical axis Z.

The respective second alignment surfaces 80 of the second lens 70 abut on the rear surfaces of the second reception portions 67 of the second lens support portions 64 so that the second lens 70 is supported by the second lens support portions 64. Accordingly, as shown in FIGS. 3A and 3B, the second lens 70 is supported by the second lens support portions 64 while the second lens 70 is aligned with respect to the optical axis Z.

The second lens 70 is aligned in the main scanning direction Y in such a manner that a convex portion (not shown) formed on the bottom surface of the second lens 70 and a concave portion (not shown) formed in the support plate 19 are fitted to each other.

Each of the second incidence surface 76 and the second emergence surface 77 in the second light passage portion 78 of the second lens 70 has a shape asymmetrical in the main scanning direction Y with respect to the optical axis Z and

TABLE 2

| $C_{mn}$ | n = 0 | n = 1 | n = 2 | n = 3 | n = 4 | n = 5 | n = 6 | n = 7 | n = 8 | n = 9 | n = 10 |
|---|---|---|---|---|---|---|---|---|---|---|---|
| m = 0 | — | 9.37E−6 | 0 | 0 | −2.43E−6 | 0 | 2.03E−8 | 0 | 2.83E−11 | 0 | −4.46E−14 |
| m = 1 | 0 | 0 | 0 | 0 | 0 | 0 | 0 | 0 | 0 | 0 | 0 |
| m = 2 | 0.0142 | −1.14E−5 | −2.37E−5 | 2.02E−8 | −4.54E−8 | 5.90E−10 | 9.83E−11 | 1.88E−12 | 3.38E−13 | 1.66E−15 | −4.02E−16 |

In this case, a numerical value except zero is set in $C_{10}$ (n=1, m=0) in Table 2. That is, when a numerical value except zero is set in $C_{10}$ (n=1, m=0), the first incidence surface 71 tilts with respect to the optical axis Z. If the surface symmetrical in the main scanning direction Y with respect to the optical axis Z is tilted in this manner to thereby form a shape asymmetrical in the main scanning direction Y with respect to the optical axis Z, the asymmetrical surface having a curvature symmetrically variable in the sub scanning direction X with respect to the optical axis Z.

In this embodiment, if the second incidence surface 76 and the second emergence surface 77 are more specifically expressed by the expression (2), numerical values shown in Table 3 are set in $C_{mn}$ in the second incidence surface 76 while numerical values shown in Table 4 are set in $C_{mn}$ in the second emergence surface 77.

TABLE 3

| $C_{mn}$ | n = 0 | n = 1 | n = 2 | n = 3 | n = 4 | n = 5 | n = 6 | n = 7 | n = 8 | n = 9 | n = 10 |
|---|---|---|---|---|---|---|---|---|---|---|---|
| m = 0 | — | 0 | 0 | 0 | −9.51E−6 | 0 | 6.20E−9 | 0 | −1.94−12 | 0 | 2.92E−16 |
| m = 1 | 0 | 0 | 0 | 0 | 0 | 0 | 0 | 0 | 0 | 0 | 0 |
| m = 2 | −0.0255 | 0 | 1.03E−4 | 0 | −2.07E−7 | 0 | 1.73E−10 | 0 | −7.63E−14 | 0 | 1.41E−17 |

TABLE 4

| $C_{mn}$ | n = 0 | n = 1 | n = 2 | n = 3 | n = 4 | n = 5 | n = 6 | n = 7 | n = 8 | n = 9 | n = 10 |
|---|---|---|---|---|---|---|---|---|---|---|---|
| m = 0 | — | 0 | 0 | 0 | −8.06E−6 | 0 | 4.16E−9 | 0 | −1.46E−12 | 0 | 2.97E−16 |
| m = 1 | 0 | 0 | 0 | 0 | 0 | 0 | 0 | 0 | 0 | 0 | 0 |
| m = 2 | −0.0515 | 0 | 9.23E−005 | 0 | −1.44E−7 | 0 | 1.01E−10 | 0 | −4.07E−14 | 0 | 6.90E−18 |

Moreover, in this embodiment, the focal length (the distance from an image side principal point to the surface of the photosensitive drum 24) of the fθ lens 56 is set at 150 mm, the effective scanning width of the laser light imaged on the photo sensitive drum 24 is set at 220 mm, and the set wavelength of the laser light source 52 is set at 780 mm. Moreover, numerical values shown in Table 5 are set in the radius R of curvature, the thickness d in the direction of the optical axis on the optical axis Z, the refractive index n and the Konig's coefficient k in each of the first incidence surface 71, the first emergence surface 72, the second incidence surface 76 and the second emergence surface 77.

TABLE 5

| | Surface Shape | R | d | n | k |
|---|---|---|---|---|---|
| — | — | — | 22 | — | — |
| First Incidence Surface | Rotationally symmetrical aspherical surface | −40.8 | 5 | 1.52 | 0 |
| First Emergence Surface | Asymmetrical polynomial aspherical surface | −42.3 | 9.3 | — | 0 |
| Second Incidence Surface | Symmetrical polynomial aspherical surface | 30.5 | 9.2 | 1.52 | −4.82 |
| Second Emergence Surface | Symmetrical polynomial aspherical surface | 42.1 | 139.1 | — | −6.69 |

As described above, in the fθ lens 56 according to this embodiment, the first incidence surface 71 of the first lens 69 is formed as an aspherical surface rotationally symmetrical with respect to the optical axis Z while the first emergence surface 72 of the first lens 69 is formed as a shape asymmetrical in the main scanning direction Y with respect to the optical axis Z and having a curvature asymmetrically variable in the sub scanning direction X with respect to the optical axis Z. Moreover, each of the second incidence surface 76 and the second emergence surface 77 of the second lens 70 is formed as a shape symmetrical in the main scanning direction Y with respect to the optical axis Z and having a curvature symmetrically variable in the sub scanning direction X with respect to the optical axis Z.

For this reason, the fθ lens 56 can be formed by a simple operation of forming the first emergence surface 72 of the first lens 69 as a shape having a curvature asymmetrically variable in the sub scanning direction X with respective to the optical axis Z, that is, by a simple operation of forming only one asymmetrical surface. A portion requiring high processing accuracy in the mold for molding the first lens 69 can be reduced. For this reason, the mold for molding the first lens 69 can be produced easily. The first lens 69 can be formed easily while reduction in cost for the production of the mold can be attained.

Because the first and second lenses 69 and 70 can be disposed on the optical axis Z, the first and second lenses 69 and 70 can be disposed accurately in a simple assembling manner. As a result, configuration can be simplified while reduction in size can be attained. Reduction in cost can be attained.

In assembling the first and second lenses 69 and 70, the first alignment surfaces 75 of the first lens 69 abut on the rear surfaces of the first reception portions 65 of the first lens support portions 63 respectively so as to be supported while the second alignment surfaces 80 of the second lens 70 abut on the rear surfaces of the second reception portions 67 of the second lens support portions 64 respectively so as to be supported. For this reason, improvement in assembling efficiency can be attained while the first and second lenses 69 and 70 can be aligned easily and accurately.

The first alignment surfaces 75 of the first lens 69 are formed in the first fixing portions 74 provided in opposite end portions of the first incidence surface 71 in the main scanning direction while the second alignment surfaces 80 of the second lens 70 are formed in the second fixing portions 79 provided in opposite end portions of the second incidence surface 76 in the main scanning direction. Accordingly, accurate alignment of the first and second lenses 69 and 70 can be achieved while the laser light scanned in the main scanning direction Y can be transmitted through the first and second lenses 69 and 70 surely.

As shown in FIG. 2, the BD sensor portion 57 has a BD mirror 82, a slit 83, a BD lens 84, and a BD sensor 85.

The BD mirror 82 is disposed in a reference position S which is on one side outward in the main scanning direction compared with the effective scanning width W of the laser light imaged on the photosensitive drum 24 on the front side of the mirror support portion 59 disposed in one end portion in the widthwise direction and which is used for defining the scanning start timing of the laser light.

The slit 83 is provided on the widthwise outside of the mirror support portion 59 disposed in the other end portion in the widthwise direction. The slit 83 is used for narrowing the laser light reflected on the BD mirror 82.

The BD lens 84 is provided on a side of the slit 83. The BD lens 84 is used so that an image of the laser light narrowed by the slit 83 is formed on the BD sensor 85.

The BD sensor 85 is provided on a side of the BD lens 84. The BD sensor 85 has photo acceptance elements. The BD sensor 85 receives the laser light from the BD lens 84 and detects the laser light.

In the BD sensor portion 57, part of the laser light scanned in the main scanning direction by the polygon mirror 54 and applied to the reference position S outward in the main scanning direction compared with the effective scanning width W is reflected from one widthwise end portion toward the other widthwise end portion by the BD mirror 82. After the laser light is narrowed by the slit 83, an image of the laser light is formed on the BD sensor 85 by the BD lens 84. In this manner, the laser light scanned in the reference position S is detected so that the scanning start timing of the laser light is measured.

The scanning unit 13 is set so that the relation between the focal length k of the fθ lens 56 and the effective scanning width W satisfies the condition 0.65<k/W<0.81. Moreover, the scanning unit 13 is set so that the relations among the focal length k, the effective scanning width W and the distance r from an end of the effective scanning width W to the reference position S satisfy the condition 0.65<k/(W+2r)<0.81.

According to this setting, the optical path from one end of the effective scanning width W to the reference position S can be secured while the scanning angle of the laser light can be reduced so that the focal length k can be shortened.

Figure 4:
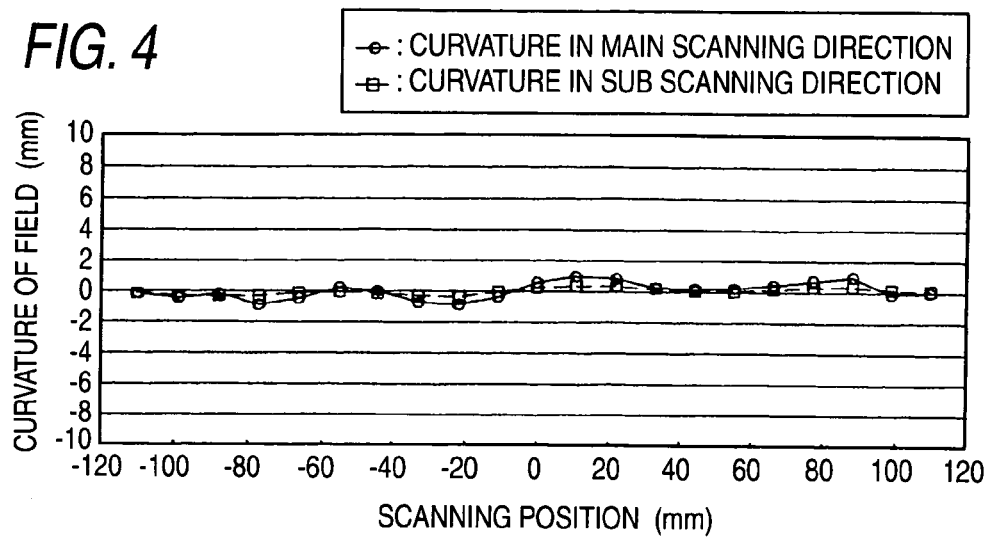
FIG. 4 is a graph showing fluctuation of curvature of field in a scanning position.
Figure 5:
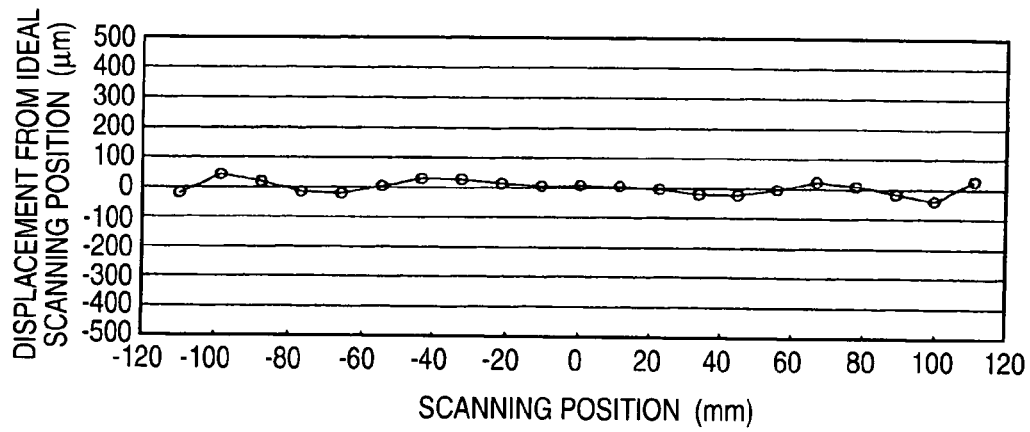
FIG. 5 is a graph showing fluctuation of displacement of a scanning position from an ideal scanning position.
Figure 6:
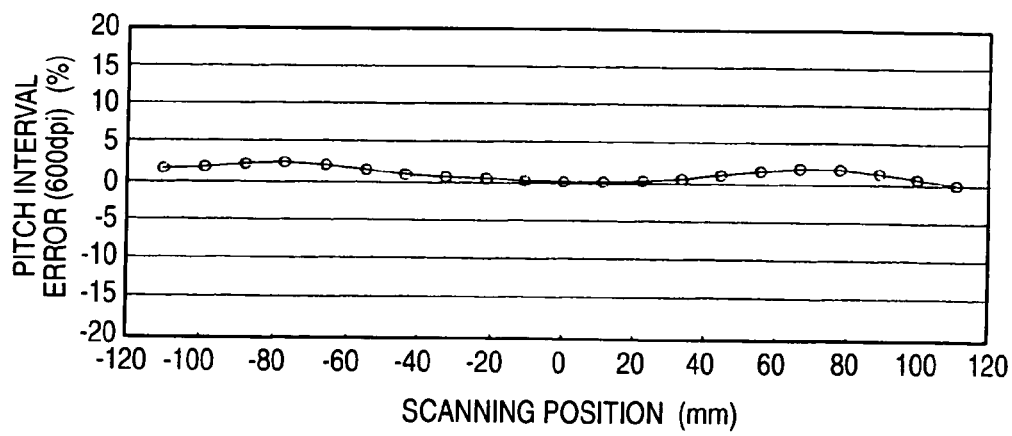
FIG. 6 is a graph showing fluctuation of pitch interval error in the scanning position.

In the scanner unit 13 having the aforementioned configuration, accurate laser light scanning can be achieved because curvature of field, displacement from the ideal scanning position and pitch interval error can be prevented with respect to the scanning position as shown in FIGS. 4, 5 and 6 while reduction in size of the apparatus can be attained.

For this reason, in the laser printer 1 according to this embodiment, which is provided with the scanner unit 13, formation of a high-quality image can be achieved while reduction in size of the apparatus can be attained.

Although the embodiment has been described on the case where the first incidence surface 71 is formed as an aspherical surface rotationally symmetrical with respect to the optical axis Z, in the embodiment may be applied to the case where the first incidence surface 71 is formed as a shape symmetrical in the main scanning direction Y with respect to the optical axis Z and having a curvature symmetrically variable in the sub scanning direction X with respect to the optical axis Z.

Although the embodiment has been described on the case where the first incidence surface 71 is formed as an aspherical surface rotationally symmetrical with respect to the optical axis Z or as a shape symmetrical in the main scanning direction Y with respect to the optical axis Z and having a curvature symmetrical variable in the sub scanning direction X with respect to the optical axis Z while the first emergence surface 72 is formed as a shape asymmetrical in the main scanning direction Y with respect to the optical axis Z and having a curvature asymmetrically variable in the sub scanning direction X with respect to the optical axis Z, the embodiments may be applied to the case where the first incidence surface 71 and the first emergence surface 72 are replaced with each other, that is, the first incidence surface 71 is formed as a shape asymmetrical in the main scanning direction Y with respect to the optical axis Z and having a curvature asymmetrically variable in the sub scanning direction X with respect to the optical axis Z while the first emergence surface 72 is formed as an aspherical surface rotationally symmetrical with respect to the optical axis Z or as a shape symmetrical in the main scanning direction Y with respect to the optical axis Z and having a curvature symmetrically variable in the sub scanning direction X with respect to the optical axis Z. Also in this case, the same effect as described above can be obtained.

In this embodiment, in order to form the first incidence surface 71 as a shape asymmetrical in the main scanning direction Y with respect to the optical axis Z and having a curvature asymmetrically variable in the sub scanning direction X with respect to the optical axis Z, more specifically, numerical values shown in Table 6 are set in $C_{mn}$ in the expression (2).

TABLE 6

| $C_{mn}$ | n = 0 | n = 1 | n = 2 | n = 3 | n = 4 | n = 5 | n = 6 | n = 7 | n = 8 | n = 9 | n = 10 |
|---|---|---|---|---|---|---|---|---|---|---|---|
| m = 0 | — | 1.84E−5 | 0 | 0 | 3.30E−5 | 0 | −4.36E−8 | 0 | 1.01E−10 | 0 | −8.97E−14 |
| m = 1 | 0 | 0 | 0 | 0 | 0 | 0 | 0 | 0 | 0 | 0 | 0 |
| m = 2 | −0.021 | 5.43E−5 | 6.50E−5 | −6.89E−7 | 4.93E−7 | 2.82E−9 | −1.42E−9 | −5.98E−12 | 1.91E−13 | 5.41E−15 | 1.73E−15 |

In order to form the first emergence surface 72 as an aspherical surface rotationally symmetrical with respect to the optical axis Z, more specifically, numerical values shown in Table 7 are set in $A_4$, $A_6$, $A_8$ and $A_{10}$ in the expression (1).

TABLE 7

| | $A_4$ | $A_6$ | $A_8$ | $A_{10}$ |
|---|---|---|---|---|
| Aspherical coefficient | 1.66E−5 | −1.39E−8 | 7.72E−11 | −7.00E−14 |

In this embodiment, when the second incidence surface 76 and the second emergence surface 77 are more specifically expressed by the expression (2), numerical values shown in Table 8 are set in $C_{mn}$ in the second incidence surface 76 while numerical values shown in Table 9 are set in $C_{mn}$ in the second emergence surface 77.

TABLE 8

| $C_{mn}$ | n = 0 | n = 1 | n = 2 | n = 3 | n = 4 | n = 5 | n = 6 | n = 7 | n = 8 | n = 9 | n = 10 |
|---|---|---|---|---|---|---|---|---|---|---|---|
| m = 0 | — | 0 | 0 | 0 | −9.47E−6 | 0 | 6.50E−9 | 0 | −2.11E−12 | 0 | 3.11E−16 |
| m = 1 | 0 | 0 | 0 | 0 | 0 | 0 | 0 | 0 | 0 | 0 | 0 |
| m = 2 | −0.025 | 0 | 1.02E−4 | 0 | −2.13E−7 | 0 | 1.69E−10 | 0 | −5.77E−14 | 0 | 7.10E−18 |

TABLE 9

| $C_{mn}$ | n = 0 | n = 1 | n = 2 | n = 3 | n = 4 | n = 5 | n = 6 | n = 7 | n = 8 | n = 9 | n = 10 |
|---|---|---|---|---|---|---|---|---|---|---|---|
| m = 0 | — | 0 | 0 | 0 | −7.40E−6 | 0 | 3.65E−9 | 0 | −1.20E−12 | 0 | 2.38E−16 |
| m = 1 | 0 | 0 | 0 | 0 | 0 | 0 | 0 | 0 | 0 | 0 | 0 |
| m = 2 | −0.051 | 0 | 8.39E−5 | 0 | −1.29E−7 | 0 | 8.03E−11 | 0 | −2.46E−14 | 0 | 3.66E−18 |

Moreover, in this embodiment, the focal length (the distance from an image side principal point to the surface of the photosensitive drum 24) of the fθ lens 56 is set at 150 mm, the effective scanning width of the laser light imaged on the photosensitive drum 24 is set at 220 mm, the set wavelength of the laser light source 52 is set at 780 mm. Numerical values shown in Table 10 are set in the radius R of curvature, the thickness d in the direction of the optical axis on the optical axis Z, the refractive index n and the Konig's coefficient k in each of the first incidence surface 71, the first emergence surface 72, the second incidence surface 76 and the second emergence surface 77.

TABLE 10

| | Surface Shape | R | d | n | k |
|---|---|---|---|---|---|
| — | — | — | 22 | — | — |
| First Incidence Surface | Asymmetrical polynimial aspherical surface | −32.8 | 5 | 1.52 | 0 |
| First Emergence Surface | Rotationally symmetrical aspherical surface | −30.9 | 9.3 | — | 0 |
| Second Incidence Surface | Symmetrical polynomial aspherical surface | 37.5 | 9.2 | 1.52 | −4.78 |
| Second Emergence Surface | Symmetrical polynomial aspherical surface | 51.1 | 140.25 | — | −9.17 |

Figure 7:
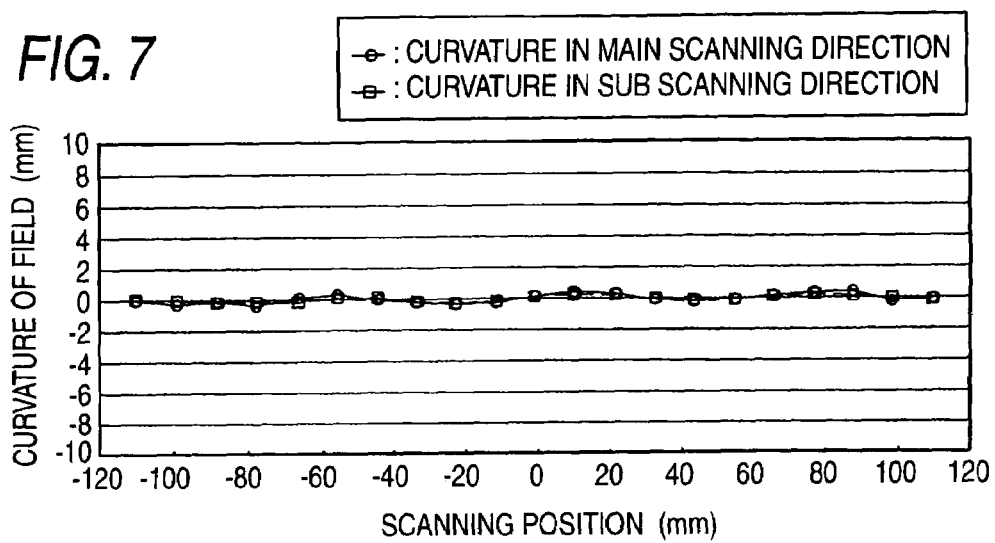
FIG. 7 is a graph showing fluctuation of curvature of field in a scanning position in another embodiment (first incident surface: asymmetrical polynomial aspherical surface, and first emergence surface: rotationally symmetrical aspherical surface)
Figure 8:
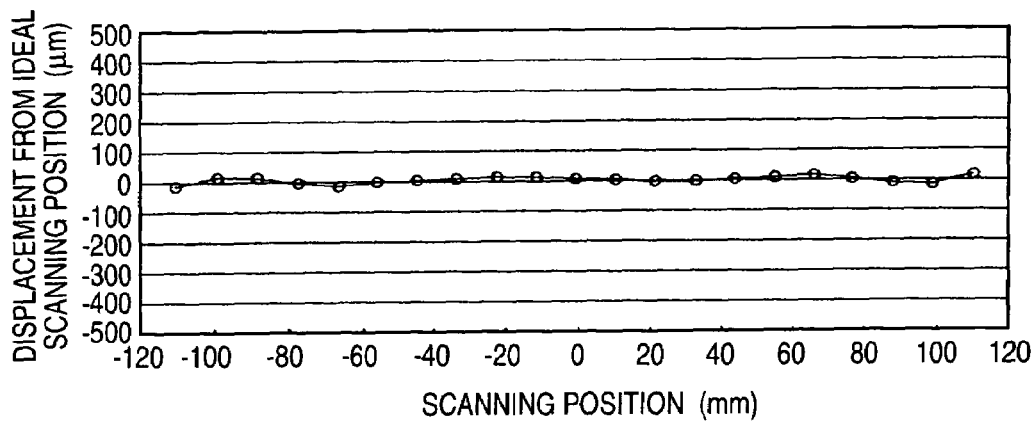
FIG. 8 is a graph showing fluctuation of displacement of a scanning position from an ideal scanning position in the other embodiment (first incident surface: asymmetrical polynomial aspherical surface, and first emergence surface: rotationally symmetrical aspherical surface)
Figure 9:
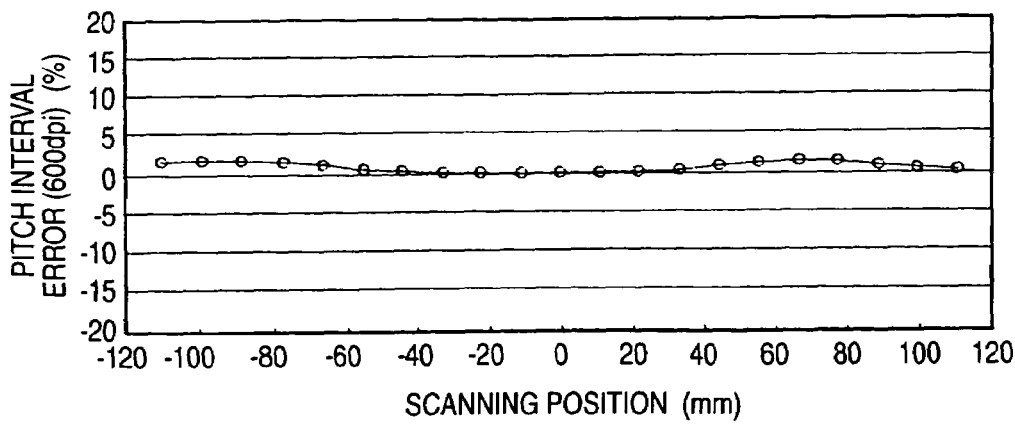
FIG. 9 is a graph showing fluctuation of pitch interval error in the scanning position in the other embodiment (first incident surface: asymmetrical polynomial aspherical surface, and first emergence surface: rotationally symmetrical aspherical surface).

Also in the scanner unit 13 having the aforementioned configuration, accurate laser light scanning can be achieved because curvature of field, displacement from the ideal scanning position and pitch interval error can be prevented with respect to the scanning position as shown in FIGS. 7, 8 and 9 while reduction in size of the apparatus can be attained.

What is claimed is:

1. A light scanning device comprising:
a light source that generates light for exposing a photoconductor;
a deflection device that deflects the light generated by the light source and that scans the light in a main scanning direction; and
an imaging device that forms an image of the light generated by the deflection device on the photoconductor;

wherein the imaging device includes;
a first lens having a first incidence surface on which light is incident, and a first emergence surface from which the light incident on the first incidence surface emerges; and
a second lens having a second incidence surface on which light is incident, and a second emergence surface from which the light incident on the second incidence surface emerges,
wherein one of the first incidence surface and the first emergence surface is an aspherical surface rotationally symmetrical with respect to an optical axis,
wherein the other of the first incidence surface and the first emergence surface has a shape asymmetrical in the main scanning direction with respect to the optical axis and having a curvature asymmetrically variable in the sub scanning direction with respect to the optical axis, and
wherein the second incidence surface and the second emergence surface has a shape symmetrical in the main scanning direction with respect to the optical axis and has a curvature symmetrically variable in the sub scanning direction with respect to the optical axis.

2. A light scanning device according to claim 1, wherein either of the first incidence surface and the first emergence surface tilts with respect to the optical axis.

3. A light scanning device according to claim 1, wherein a surface symmetrical in the main scanning direction with respect to the optical axis tilts to form the shape asymmetrical in the main scanning direction with respect to the optical axis.

4. A light scanning device according to claim 1, wherein an amount of sag in the shape having a curvature asymmetrically variable in the sub scanning direction with respect to the optical axis is expressed as an aspherical surface represented by a two-dimensional polymoninal.

5. A light scanning device according to claim 1, wherein the imaging device satisfies a condition $$0.65 < k/W < 0.81$$

in which k is a focal length of the imaging device, and W is an effective scanning width of the photoconductor.

6. A light scanning device according to claim 1, wherein the imaging device satisfies the condition $$0.65 < k/(W+2r) < 0.81$$

in which k is a focal length of the imaging device, W is an effective scanning width of the photoconductor, and r is a distance from an end of the effective scanning width W to a position irradiated with light for defining scanning start timing in the photoconductor.

7. A light scanning device according to claim 1, wherein the first lens is formed so that the thickness of the first lens on the optical axis is not larger than 7 mm in a direction of the optical axis.

8. A light scanning device according to claim 1, wherein the deflection device has a reflection surface for reflecting the light given from the light source, and
wherein the first lens is disposed so that the distance from a point of reflection of the light on the reflection surface to the first incidence surface is longer than 20 mm.

9. A light scanning device according to claim 1, wherein the first lens is formed so that the maximum thickness of the first lens in the direction of the optical axis is not larger than 7 mm, and that the rate of fluctuation in the thickness of the first lens in the direction of the optical axis is not larger than 60%.

10. A light scanning device according to claim 1, wherein at least one of the first incidence surface and the first emergence surface has at least one inflection point in a sectional shape along the main scanning direction.

11. A light scanning device according to claim 1, wherein the first incidence surface is an aspherical surface rotationally symmetrical with respect to the optical axis, and
wherein the first emergence surface has a shape asymmetrical in the main scanning direction with respect to the optical axis and having a curvature asymmetrically variable in the sub scanning direction with respect to the optical axis.

12. A scanning device according to claim 1, wherein
at least one of the first lens and the second lens has an alignment surface for alignment with the optical axis, and the light scanning device further comprises;
a housing that stores the first lens and the second lens, having a support portion which supports the at least one of the first lens and the second lens while the support portion aligns the at least one of the first lens and the second lens by contacting with the alignment surface.

13. A light scanning device according to claim 12, wherein each of the first lens and the second lens has the alignment surface, and
wherein the support portion includes;
a first support portion being brought into contact with the alignment surface of the first lens to align and support the first lens; and
a second support portion being brought into contact with the alignment surface of the second lens to align and support the second lens.

14. A light scanning device according to claim 12, wherein the alignment surfaces are provided in opposite end portions of the first incidence surface in the main scanning direction.

15. A light scanning device according to claim 12, wherein the alignment surfaces are provided in opposite end portions of the second incidence surface in the main scanning direction.

16. An image-forming apparatus comprising:
a photoconductor on which an electrostatic latent image is formed; and
a light scanning device according to claim 1.

17. A light scanning device comprising:
a light source that generates light for exposing a photoconductor,
a deflection device that deflects the light generated by the light source and that scans the light in a main scanning direction, and
an imaging device that forms an image of the light generated by the deflection device on the photoconductor,
wherein the imaging device includes;
a first lens having a first incidence surface on which light is incident, and a first emergence surface from which the light incident on the first incidence surface emerges; and
a second lens having a second incidence surface on which light is incident, and a second emergence surface from which the light incident on the second incidence surface emerges,
wherein one of the first incidence surface and the first emergence surface has a shape symmetrical in the main scanning direction with respect to the optical axis,
wherein the one of the first incidence surface and the first emergence surface has a curvature symmetrically variable in a sub scanning direction with respect to the optical axis,
wherein the other of the first incidence surface and the first emergence surface has a shape asymmetrical in the main scanning direction with respect to the optical axis and having a curvature asymmetrically variable in the sub scanning direction with respect to the optical axis, and
wherein the second incidence surface and the second emergence surface has a shape symmetrical in the main scanning direction with respect to the optical axis and has a curvature symmetrically variable in the sub scanning direction with respect to the optical axis.

18. A light scanning device according to claim 17, wherein an amount of sag in the shape having a curvature symmetrically in the sub scanning direction with respect to the optical axis is expressed as an aspherical surface represented by a two-dimensional polymoninal.

19. A light scanning device according to claim 17, wherein the first incidence surface has a shape symmetrical in the main scanning direction with respect to the optical axis, and has a curvature symmetrically variable in the sub scanning direction with respect to the optical axis; and
the first emergence surface has a shape asymmetrical in the main scanning direction with respect to the optical axis and having a curvature asymmetrically variable in the sub scanning direction with respect to the optical axis.

20. An image-forming apparatus comprising:
a photoconductor on which an electrostatic latent image is formed; and
a light scanning device according to claim 18.

* * * * *